July 8, 1952     R. S. WALTER     2,602,701
HOSE NOZZLE RECOIL ELIMINATING COUPLING
Filed Aug. 3, 1950
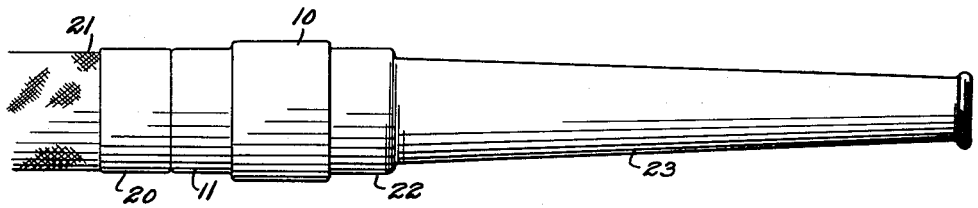
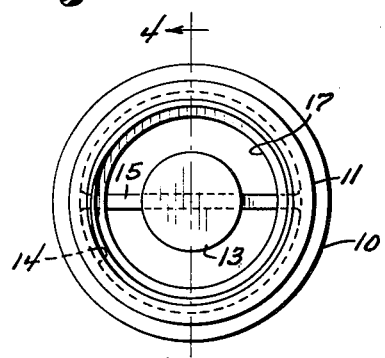 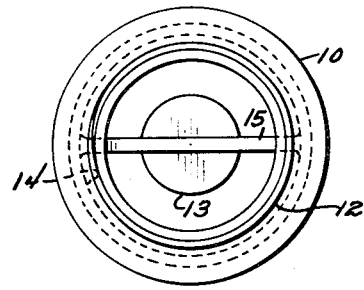
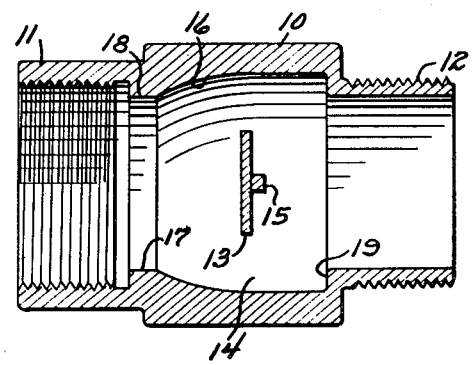
INVENTOR.
Richard S. Walter
ATTORNEYS

UNITED STATES PATENT OFFICE 2,602,701

HOSE NOZZLE RECOIL ELIMINATING COUPLING

Richard S. Walter, Sisters, Oreg.

Application August 3, 1950, Serial No. 177,451

1 Claim. (Cl. 299—107)

This invention relates to couplings or fittings for attaching a nozzle to the end of a hose such as a fire hose where the recoil makes it difficult for one man to hold the nozzle, and in particular a coupling having an enlarged chamber therein with a shoulder at the forward end of the chamber and a baffle extended across the chamber whereby water rushing through the coupling exerts a forward thrust against the baffle and shoulder counteracting the recoil action of the nozzle.

The purpose of this invention is to provide a means in a nozzle connection particularly of a fire hose whereby the forward thrust of water passing through the hose is harnessed and used to counteract the recoil action.

In the conventional type of fire hose nozzle where water is discharged at relatively high velocity two or three men are required to hold the nozzle because of the resulting recoil action. With this thought in mind this invention, contemplates a coupling member having an enlarged chamber with an internally threaded female sleeve at one side, a threaded stud on the other and a baffle suspended in the intermediate part of the chamber by a transversely disposed bar.

The object of this invention is, therefore, to provide means for forming a hose nozzle connecting coupling in which the forward thrust of water passing through the nozzle is used to offset or counteract the resulting recoil action of the nozzle.

Another object of the invention is to provide a recoil eliminating coupling for a nozzle particularly of the type used on fire hose that may be inserted between the hose and nozzle without changing parts of the hose or nozzle.

A further object of the invention is to provide a recoil eliminating coupling particularly adapted for use in fire hose which is of a simple and economical construction.

With these and other objects and advantages in view the invention embodies a cylindrical chamber having an outwardly tapering inner wall with a female coupling element on one end, a male coupling element on the opposite end and a transversely disposed baffle suspended in the chamber and positioned to coact with a shoulder in the outlet end of the chamber for harnessing the forward thrust of water passing through the hose and nozzle and using the same to counteract the recoil force of the nozzle.

Other features and advantages of the invention will appear from the following description taken in connection with the drawings wherein:

Figure 1 is a side elevational view of a nozzle showing the nozzle connected to a hose by the recoil eliminating coupling.

Figure 2 is an end elevational view of the coupling looking toward the end of the coupling having female connections thereon.

Figure 3 is an end elevational view looking toward the male connection end of the coupling.

Figure 4 is a longitudinal section through the coupling illustrating the relative positions of the parts.

Referring now to the drawings wherein like reference characters denote corresponding parts the recoil eliminating coupling of this invention includes a cylindrical body 10 having an internally threaded sleeve 11 at one end, an externally threaded sleeve 12 at the opposite end and a baffle 13 suspended in a chamber 14 of the coupling by the bar 15.

The chamber 14 is provided with an arcuate tapering peripheral surface 16 which extends from an opening 17 in an annular ridge 18 and the outer end of the wall 16 extends to a shoulder 19 at the inner end of the sleeve 12.

The bar 15 extends across the intermediate part of the cylindrical body 10 and may be integral with the body or attached thereto by any suitable means. The baffle 13 which is carried by the bar 15 may also be integral with the bar or attached thereto by any suitable means.

With the parts arranged in this manner the internally threaded sleeve 11 provides a female coupling member that receives a male coupling 20 of a hose 21 and the externally threaded sleeve 12 receives an internally threaded hub 22 of a nozzle 23. With the parts assembled as illustrated in Figure 1, water rushing through the hose and nozzle impinges the baffle 13 and the shoulder 19 thereby exerting a forward thrust on the coupling member and the thrust resulting therefrom counteracts the recoil normally resulting from a conventional nozzle.

It will be understood that the coupling may be of any suitable size, however, in order not to reduce the volume of water passing through the coupling the transverse area of the chamber 14 less the area of the baffle and bar should not be less than the area of the opening through the male coupling sleeve 12.

It will be understood that modifications may be made in the design and arrangement of the parts without departing from the spirit of the invention.

What is claimed is:

In a nozzle mounting coupling for a hose, the combination which comprises a body member having a chamber therein with an internally threaded sleeve extended from one end and an externally threaded sleeve extended from the opposite end and having a contricted throat in the end thereof from which the internally threaded sleeve extends and a shoulder in the end thereof from which the externally threaded sleeve extends, said body member having a transversely disposed bar integral at its ends with said coupling and extended across the intermediate part of the chamber therein and having a baffle mounted on the bar in engagement with the bar and integral therewith and positioned on the axis of the chamber and internally and externally threaded sleeves.

RICHARD S. WALTER.

REFERENCES CITED

The following references are of record in the file of this patent:

UNITED STATES PATENTS

| Number | Name | Date |
| --- | --- | --- |
| 2,218,189 | Allen | Oct. 15, 1940 |

FOREIGN PATENTS

| Number | Country | Date |
| --- | --- | --- |
| 422,592 | France | Jan. 23, 1911 |